F. E. FARNSWORTH.
RUNNING GEAR FOR MOTOR VEHICLES.
APPLICATION FILED NOV. 6, 1913.
1,271,298.
Patented July 2, 1918.
2 SHEETS—SHEET 2.
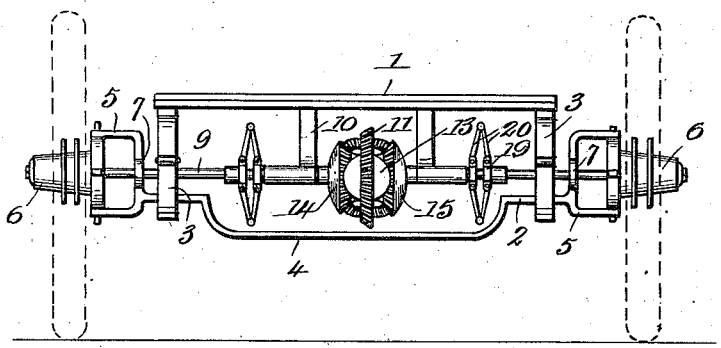
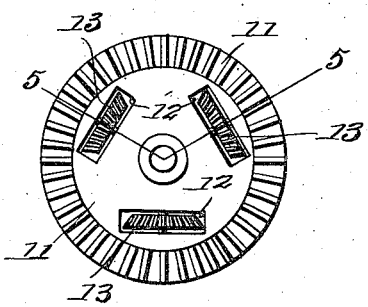
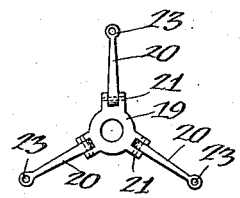
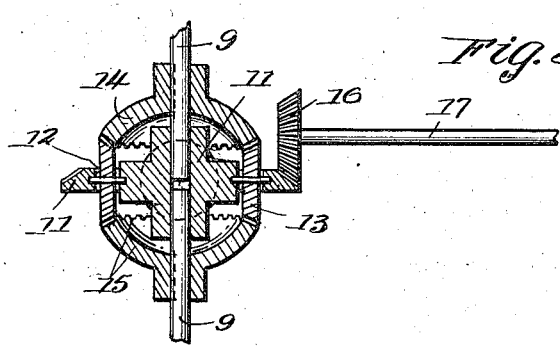

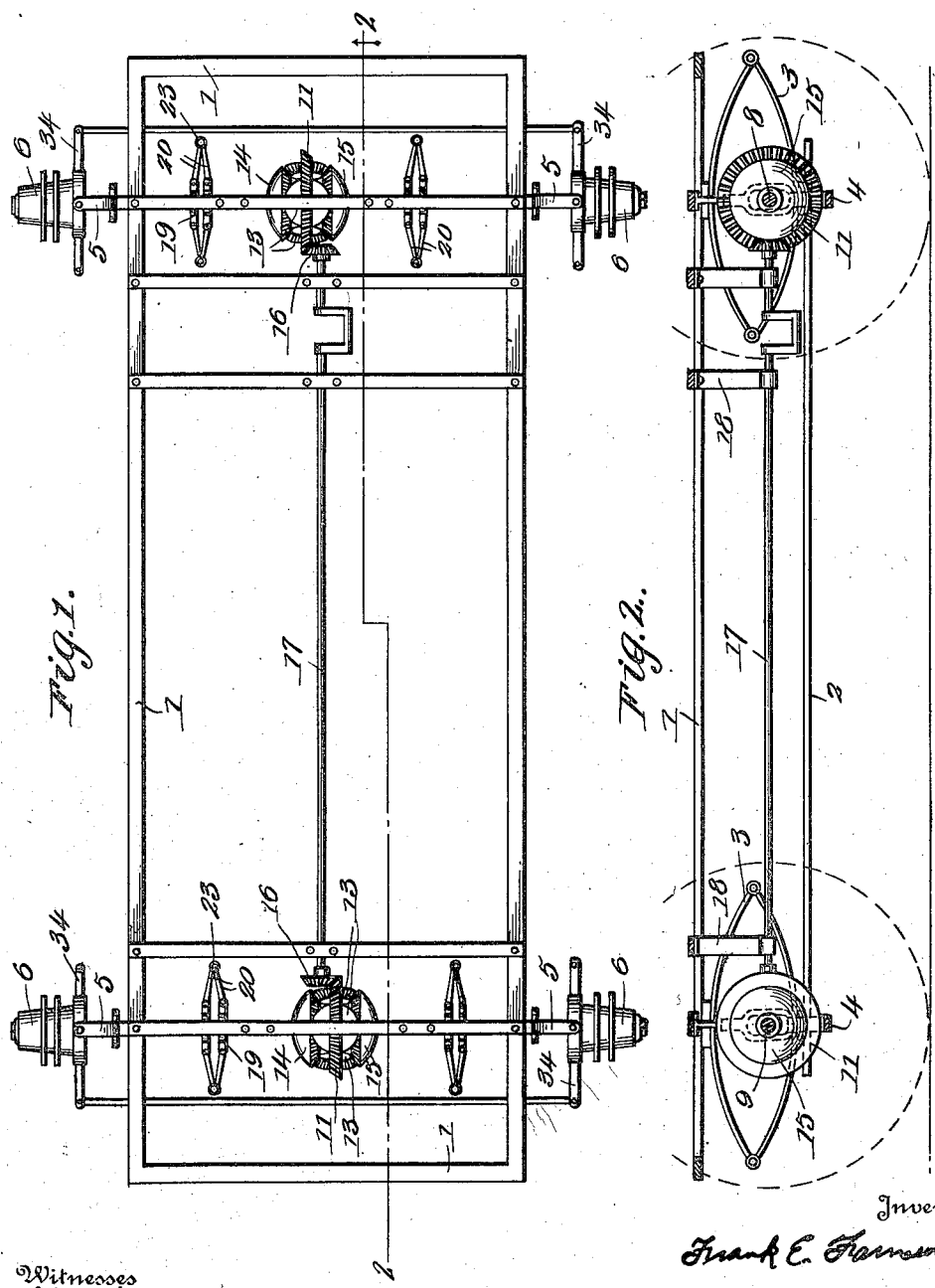

UNITED STATES PATENT OFFICE.

FRANK E. FARNSWORTH, OF CHIEF, MICHIGAN.

RUNNING-GEAR FOR MOTOR-VEHICLES.

1,271,298.  
Specification of Letters Patent.  
Patented July 2, 1918.

Application filed November 6, 1913. Serial No. 799,568.

*To all whom it may concern:*

Be it known that I, FRANK E. FARNSWORTH, citizen of the United States, residing at Chief, in the county of Manistee and State of Michigan, have invented certain new and useful Improvements in Running-Gear for Motor-Vehicles, of which the following is a specification.

This invention relates to improved running gear for motor vehicles, and the primary object thereof is to provide equalizing means embodying a plurality of operatively connected gears whereby the several wheels of the vehicle may be rotated at the desired rate of speed during a turning operation, thereby avoiding the slipping and skidding of one wheel heretofore apparent in effecting a short or sharp turn of the vehicle.

The invention further resides in the provision of means including a pair of expansible shaft couplings, so arranged and situated with respect to the rear and front axles of the vehicle as to provide for the lateral expansion thereof during a turning operation.

Another object of the invention is to provide means so associated with the usual steering mechanism of a vehicle as to swing or turn the wheels thereof at an angle to the vehicle axle to thus provide for a sharp or short turning of the vehicle; each set of wheels being so connected as to remain in parallel relation; means being situated intermediate the extremity of each axle to provide for the rotation thereof as well as to provide for the rotation of the outer wheel (not shown) at a greater rate of speed than that imparted to the inner wheel, it being apparent upon practical application of the invention that one wheel must necessarily rotate at a lesser rate of speed, otherwise slipping and skidding would be manifest.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a top plan view of a motor vehicle frame, the mechanism comprising the present invention being supported thereby;

Fig. 2 is a section on the line 2—2 of Fig. 1;

Fig. 3 is a rear elevation of the vehicle as illustrated in Fig. 1, the vehicle wheels being shown in dotted lines;

Fig. 4 is an enlarged elevation of the operating gear comprising a part of the equalizing means;

Fig. 5 is a section on the line 5—5 of Fig. 4;

Fig. 6 is an enlarged elevation of one section of the expansible coupling.

Referring now to the drawings wherein is illustrated the preferred embodiment of my invention the numeral 1 designates the main or supporting frame of the vehicle, beneath which and in parallel spaced relation thereto I provide an auxiliary or under slung frame 2, the latter being supported in such spaced relation by means of springs 3 interposed therebetween and arranged respectively at the front and rear ends of the vehicle frame. The springs 3 not only provide a yieldable support for the main frame 1, but also form a yieldable support for the auxiliary frame 2, the latter being so disposed with respect to the springs as to extend transversely therethrough as is illustrated to advantage in Fig. 3 of the drawings, a portion of the said auxiliary frame being offset as at 4, the purpose of which is obvious upon reference to said Fig. 3.

At each end of the frame 2, preferably formed integrally therewith, I provide a hub supporting bracket designated in its entirety by the numeral 5, between the extensions of which the hubs designated 6 are arranged, the detail construction of the said hub to be hereinafter fully described. Bearings 7 are formed in each bracket 5, the bearings at one end of the auxiliary frame 2 being alined to effect a support for the respective front and rear axles or shafts 8 and 9 as they will be hereinafter termed. Hanger bearings 10 depend from the main frame 1 through which the said shafts 8 and 9 extend. Each shaft is divided centrally as is illustrated in Fig. 5 of the drawings, an operating beveled gear 11 being arranged to loosely embrace the adjacent extremities of the shaft sections formed by the said division of the shaft. Elongated openings 12 are formed in the operating gear 11 in spaced relation to the periphery thereof, preferably three, within which is mounted for rotation small or equalizing beveled gears 13, the rotation of which is in a direction transverse to the rotation of the said operating gear within which they are arranged. The three small beveled gears although rotating independently in a direction opposite to the rotation of the operating gear 11 are moved bodily with the said operating gear during the rotation of the latter, and as each of the said gears mesh within beveled gears 14 and 15, keyed, one to each of the shaft sections as shown, it is apparent that the said shaft sections are driven at a rate of speed equal to the rotation of the gear 11, at the same time permitting the vehicle wheel carried by one of the said shaft sections to rotate, during the turning of the vehicle, at a rate of speed greater or less than the rotation of the other wheel mounted upon the adjacent or alined shaft section driven from the same source of power.

Motion is imparted to the operating gear 11 by means of a beveled gear 16 meshing thereinto, the said gear 16 being mounted upon a driven shaft 17 extending longitudinally of the vehicle frame and journaled within hanger bearings 18 supported thereby. The arrangement of the differential gearing above described is provided in duplicate at the forward end of the vehicle frame as well as at the rear, the same reference numerals applying to both. The detail construction of the expansible shaft coupling being the same in the several instances wherein it is employed, the description of one will be herein set forth.

The axles or shafts 8 and 9 are subdivided into sections other than at the point embraced by the operating gear 11, the second division occurring in each of the shaft sections above mentioned at a point between the bearings 10 and the bearings 7. An expansible coupling is provided to connect the extremities of the shaft sections formed by the said last mentioned subdivision, which coupling comprises a band 19 arranged, one upon each of the section ends, each band having a plurality of uniformly spaced ears formed thereupon to which are pivotally connected as at 21 a plurality of radiating arms 20 the free end of the said arms being pivotally joined as at 23 to thus provide a shaft coupling capable of lateral expansion and contraction.

Slight lateral expansion of the shafts 8 and 9 is occasioned during the turning of the vehicle, this being permitted by the provision of the said expansible coupling.

From the above, taken in connection with the accompanying drawings, it is apparent that motion may be imparted to the several wheels of the vehicle for driving the same at the same time permitting one of the said wheels to rotate at a rate of speed greater than the speed of rotation of another of the said wheels, this being rendered possible by the provision of the differential gears above disclosed; that the entire mechanism comprising the present invention is underslung or supported beneath the main frame of the vehicle; and that lateral expansion of the axles or shafts is made possible by the provision of the expansible coupling employed in connection with the present invention.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a vehicle, the combination of a driving shaft divided at its middle portion and subdivided at portions between said middle portion and its respective ends, transmission gearing interposed in the shaft at its middle portion so as to allow relative rotary movement of the main divisions of the shaft at said middle portion, and a pair of links between the adjacent ends of the subdivisions, said links being connected to each other and to the said ends of the shaft so as to allow relative longitudinal movement thereof and prevent relative rotary movement of said subdivisions.

2. In a vehicle, the combination of a driving shaft divided at its middle portion and subdivided at portions between said middle portion and its respective ends, transmission gearing interposed in the shaft at its middle portion so as to allow relative rotary movement of the main divisions of the shaft at said middle portion, radial arms rigidly secured to the adjacent ends of the subdivisions, and links pivotally connected to the terminals of said arms and to each other so as to allow relative longitudinal movement thereof, and prevent relative rotary movement of said subdivisions.

In testimony whereof I affix my signature in presence of two witnesses.

FRANK E. FARNSWORTH.

Witnesses:
A. E. MOEN,
LOTTIE MOEN.